United States Patent
Nekoui et al.

(10) Patent No.: US 11,159,988 B2
(45) Date of Patent: Oct. 26, 2021

(54) INTERFERENCE-AWARE NON-HOMOGENEOUS CBSD CHANNEL ASSIGNMENT AND INCLUDING CHANNEL ASSIGNMENT BASED ON DATA PRIORITY

(71) Applicant: FORD GLOBAL TECHNOLOGIES, LLC, Dearborn, MI (US)

(72) Inventors: Mohammad Nekoui, Novi, MI (US); Navid Tafaghodi Khajavi, Troy, MI (US); Hamed Asadi, Troy, MI (US); Mohsen Bahrami, Troy, MI (US); Amin Ariannezhad, Troy, MI (US); Praveen Kumar Yalavarty, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 32 days.

(21) Appl. No.: 16/834,951

(22) Filed: Mar. 30, 2020

(65) Prior Publication Data
US 2021/0306911 A1  Sep. 30, 2021

(51) Int. Cl.
| H04B 7/212 | (2006.01) |
| H04W 28/20 | (2009.01) |
| H04W 28/06 | (2009.01) |
| H04B 1/7087 | (2011.01) |
| H04W 4/46 | (2018.01) |

(52) U.S. Cl.
CPC .......... *H04W 28/20* (2013.01); *H04B 1/7087* (2013.01); *H04W 4/46* (2018.02); *H04W 28/06* (2013.01)

(58) Field of Classification Search
CPC ..... H04L 47/2433; H04L 67/22; H04L 67/26; H04L 43/0805; H04L 45/302; H04L 47/6225; H04L 45/22; H04L 47/6215; H04L 47/6275; H04L 41/5048; H04L 41/5045; H04H 20/77; H04W 48/18; H04W 8/08; G06Q 30/0603
See application file for complete search history.

(56) References Cited

U.S. PATENT DOCUMENTS

| 8,045,458 B2 | 10/2011 | Alperovitch et al. |
| 8,619,634 B2 | 12/2013 | Meier |

(Continued)

FOREIGN PATENT DOCUMENTS

WO   2018114000 A1   6/2018

*Primary Examiner* — Phuoc H Doan
(74) *Attorney, Agent, or Firm* — Michael J. Spenner; Brooks Kushman P.C.

(57) ABSTRACT

A graph of devices is constructed, each device requiring an amount of bandwidth over the network, each vertex of the graph corresponding to a respective one of the devices, each edge of the graph connecting devices according to a weight denoting interference between the connected devices. The vertices of the graph are labeled with labels such that no two vertices sharing the same edge have the same label, each label requiring bandwidth corresponding to the device of that label requiring the most bandwidth. If the sum of the bandwidth required for the labels exceeds the set bandwidth, the edge of the graph having the least interference is deleted, and the perform the construct and label operations are repeated. If the sum of the bandwidth required for the labels is within the set bandwidth, the bandwidth is assigned to the devices.

18 Claims, 9 Drawing Sheets

(56) References Cited

U.S. PATENT DOCUMENTS

| | | |
|---|---|---|
| 10,405,190 B2 | 9/2019 | Khoshnevisan et al. |
| 2005/0174958 A1* | 8/2005 | Miller .................. H04W 28/20 370/321 |
| 2015/0079974 A1 | 3/2015 | Farhadi et al. |
| 2018/0131456 A1* | 5/2018 | Kits van Heyningen ................... H04H 20/77 |
| 2018/0376341 A1 | 12/2018 | Khoshnevisan et al. |
| 2019/0373610 A1 | 12/2019 | Cimpu et al. |

* cited by examiner

|  | First Priority Data = 50MB<br>Second Priority Data = 550MB<br>Total Data Transfer = 600 MB | First Priority Data = 100MB<br>Second Priority Data = 200MB<br>Total Data Transfer = 300 MB |
|---|---|---|
|  | ① | ② |
| Without Priority Consideration: | 20 MHz | 10 MHz |
| With Priority Consideration: (step-1) | 10 MHz | 20 MHz |
| (step-2) | 22 MHz | 8 MHz |

INTERFERENCE-AWARE NON-HOMOGENEOUS CBSD CHANNEL ASSIGNMENT AND INCLUDING CHANNEL ASSIGNMENT BASED ON DATA PRIORITY

TECHNICAL FIELD

Aspects of the present disclosure generally relate to interference-aware non-homogenous channel assignment for citizens broadband radio service devices, including channel assignment based on data priority.

BACKGROUND

Autonomous vehicles may utilize vehicle-to-vehicle (V2V) communications to communicate data between vehicles. Autonomous vehicles may also utilize vehicle-to-infrastructure (V2I) to communicate data between the vehicles and infrastructure. This data may include sensor information collected by the vehicles.

The Citizens Broadband Radio Service (CBRS) is 150 MHz of spectrum in the 3500 MHz band that is reserved for commercial use. CBRS devices (sometimes referred to as CBSDs) may access the CBRS network. The allocation of spectrum within the CBRS band is performed using a spectrum access system (SAS). The SAS operates as automated frequency coordinator to manage the CBRS spectrum.

SUMMARY

In one or more illustrative examples, a system for allocating network bandwidth among devices includes a controller of a network configured to perform an allocation of a set bandwidth among devices, the allocation including to construct a graph of the devices, each device requiring an amount of bandwidth over the network, each vertex of the graph corresponding to a respective one of the devices, each edge of the graph connecting devices according to a weight denoting interference between the connected devices; label the vertices of the graph with labels such that no two vertices sharing the same edge have the same label, each label requiring bandwidth corresponding to the device of that label requiring the most bandwidth; if the sum of the bandwidth required for the labels exceeds the set bandwidth, delete the edge of the graph having the least interference, and again perform the construct and label operations; and if the sum of the bandwidth required for the labels is within the set bandwidth, assign the bandwidth to the devices.

In one or more illustrative examples, a method for performing an allocation of a set bandwidth among devices of a network, includes constructing a graph of the devices, each device requiring an amount of bandwidth over the network, each vertex of the graph corresponding to a respective one of the devices, each edge of the graph connecting devices according to a weight denoting interference between the connected devices; labeling the vertices of the graph with labels such that no two vertices sharing the same edge have the same label, each label requiring bandwidth corresponding to the device of that label requiring the most bandwidth; if the sum of the bandwidth required for the labels exceeds the set bandwidth, deleting the edge of the graph having the least interference, and again perform the construct and label operations; and if the sum of the bandwidth required for the labels is within the set bandwidth, assigning the bandwidth to the devices.

In one or more illustrative examples, A non-transitory computer-readable medium includes instructions for performing an allocation of a set bandwidth of a network among devices that, when executed by a processor, cause the processor to construct a graph of the devices, each device requiring an amount of bandwidth over the network, each vertex of the graph corresponding to a respective one of the devices, each edge of the graph connecting devices according to a weight denoting interference between the connected devices; label the vertices of the graph with labels such that no two vertices sharing the same edge have the same label, each label requiring bandwidth corresponding to the device of that label requiring the most bandwidth; if the sum of the bandwidth required for the labels exceeds the set bandwidth, delete the edge of the graph having the least interference, and again perform the construct and label operations; and if the sum of the bandwidth required for the labels is within the set bandwidth, assign the bandwidth to the devices.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Aspects of the disclosure relate to use of inhomogeneous frequency planning, where channels of disparate bandwidths are allocated to different CBRS devices (CBSDs) in the network. The disparity in bandwidth allocation may be useful for various scenarios. One such scenario is use by an autonomous vehicle, where terminal layout, structural constraints, and vehicle arrival processes dictate the capacity each base station should provide. Further aspects of the disclosure relate to priority-based assignment of bandwidth to CBSDs, where priority of the data is considered in the bandwidth allocation and adjustments may be made to the allocation over time.

Figure 1:
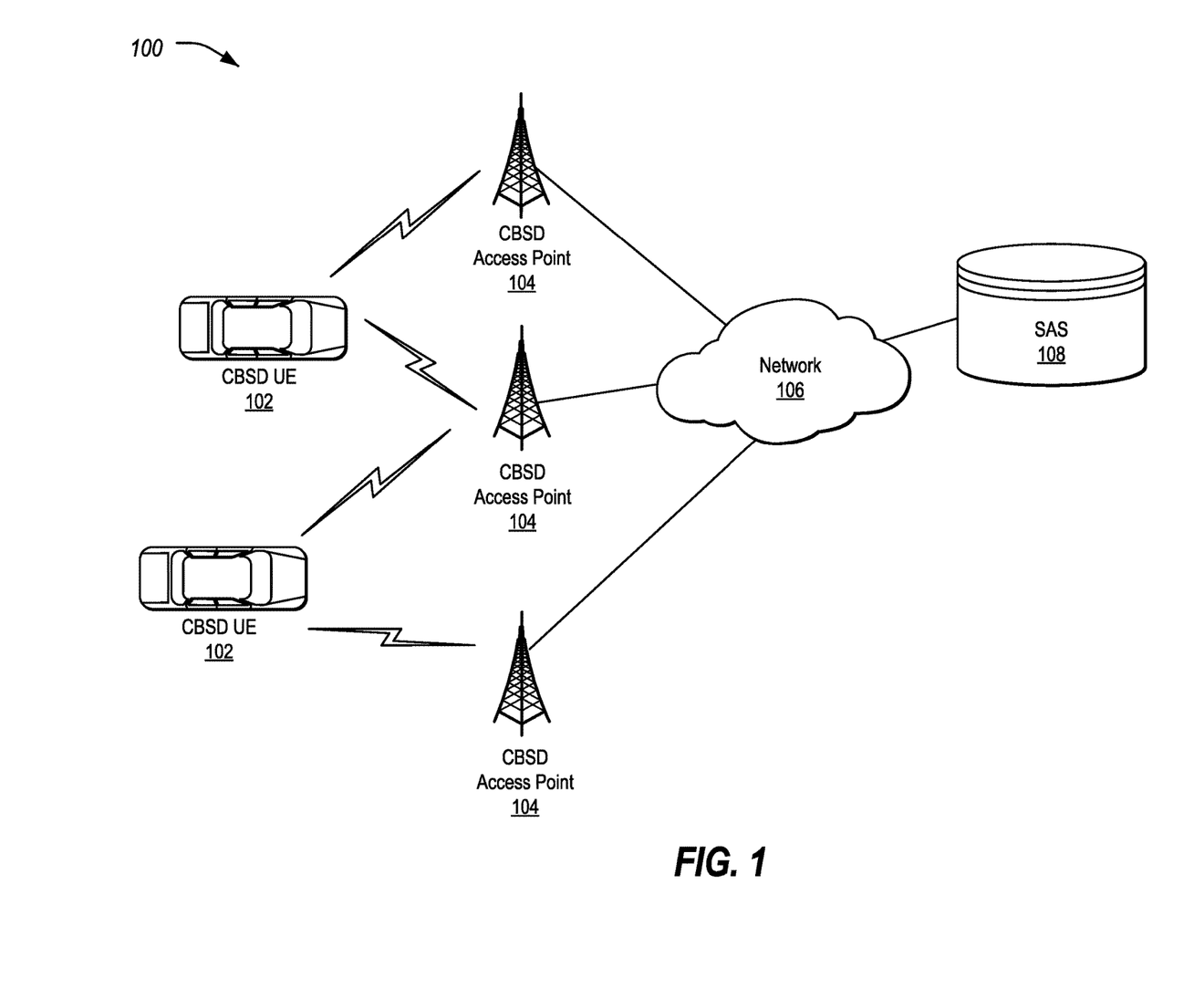
FIG. 1 illustrates an example system for the use of CBRS by CBSD user equipment.

FIG. 1 illustrates an example system for the use of CBRS by CBSD user equipment (UE) 102. In general, CBRS utilizes spectrum sharing with a three-tiered hierarchy allocating 150 MHz of contiguous spectrum between 3550-3700 MHz. These tiers include top-tier services (e.g., U.S. Navy radars and fixed satellite earth stations), which have top priority, followed by middle-tier services having Priority Access Licensees (PAL) and finally followed by General Authorized Access (GAA) users.

As shown, the CBSD UE 102 devices are configured to wirelessly communicate with the CBSD access points 104 over the CBRS spectrum, which allow the CBSD UEs 102 to access a private cellular network core 106. In an example, the cellular network core 106 may be a 4G Long Term Evolution (LTE) network core. In another example, the cellular network core 106 may be a 5G network core. In yet a further example the cellular network core 106 may make use of one or more other cellular network technologies. The allocation of spectrum to the CBSD access points 104 is performed by a Spectrum Access System (SAS) 108 entity. The SAS 108 may provide an owner or manager of the network with information about available channels of the cellular network core 106. This information can be utilized to perform frequency planning among the cells. This functionality is typically not provided to customers of conventional LTE networks by mobile network operators (MNOs).

A network typically includes many CBSD access points 104, where each CBSD access point 104 provides wireless communication service to a geographic area surrounding the respective access point 104. These geographic areas served by the CBSD access points 104 may be referred to as cells. Interference between neighboring cells of the cellular network core 106 can adversely affect network performance in terms of throughput and/or latency. This, in turn, may increase data offload times of autonomous vehicles and amounts to increased downtime and operational costs. Accordingly, the SAS 108 may be configured to assign orthogonal channels to interfering cells as a possible approach to use to mitigate the effects of such interference.

Additionally, the SAS 108 may be configured to perform inhomogeneous frequency planning, where channels of disparate bandwidths are allocated to different CBSD access points 104 in the network. The disparity in bandwidth allocation between CBSD access points 104 may be useful for data offload from CBSD UEs 102 of autonomous vehicles, where terminal layout, structural constraints, and vehicle arrival processes dictate the capacity each CBSD access point 104 should provide.

Figure 2:
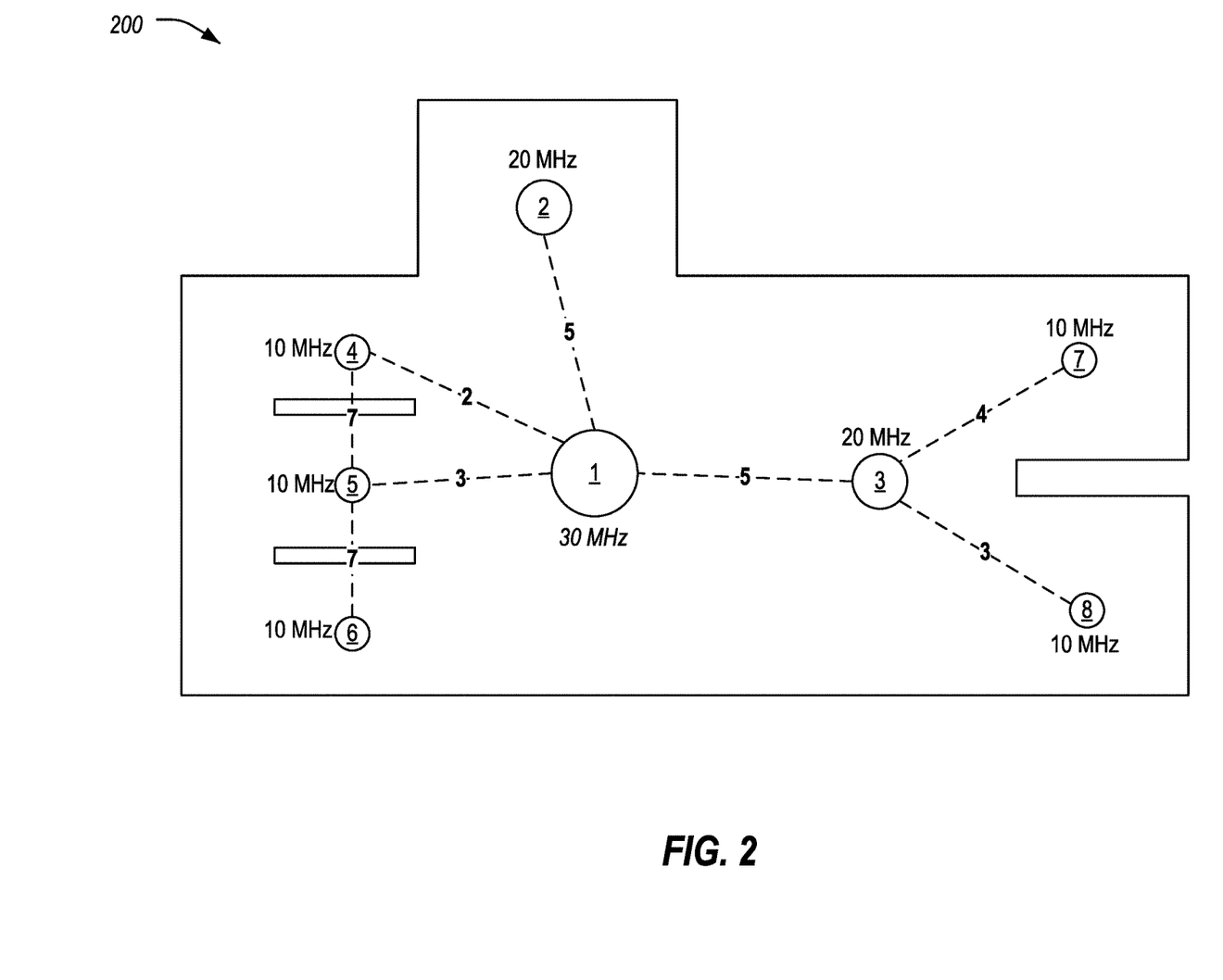
FIG. 2 illustrates an example layout of CBSD access points for use in an example application of inhomogeneous frequency planning.

FIG. 2 illustrates an example layout 200 of CBSD access points 104 for use in an example application of inhomogeneous frequency planning. The CBSD access points 104 may be used to provide the CBSD UE 102 with access to the cellular network core 106. As noted above, the SAS 108 may provide a range of the frequencies from the 3550-3700 MHz to be shared among the CBSD access points 104. In one simple example, each CBSD access point 104 may be assigned a 10 MHz minimum channel bandwidth within the range allowed by SAS 108. Then, multiple 10 MHz channels (adjacent or non-adjacent) can be aggregated and assigned to a CBSD access point 104 to provide that CBSD access point 104 with a higher capacity.

The SAS 108 may be configured to maintain and access information indicative of the layout of the terminal, the physical characteristics of the environment, and the current locations of the CBSD UEs 102. As shown, the example environment includes eight CBSD access points 104 within a terminal, as well as several obstructions. The CBSD access point 1 has a clear path to each of the access points 2 through 5. However, there is an obstruction between CBSD access points 4 and 5, between CBSD access points 5 and 6, and between CBSD access points 7 and 8.

There may be interference between the CBSD access points 104 due to factors such as the coverage overlap between the CBSD access points 104. Moreover, the amount of interference may depend on factors such as a direction of traffic (upload vs download), transmit power of the CBSD access points 104, obstructions between the CBSD access points 104, and distance between the CBSD access points 104.

To address these issues, the SAS 108 may be configured to create a graph representative of the environment, where vertices of the graph represent CBSD access points 104, and where weighted edges of the graph represent interference due to coverage overlap between the CBSD access points 104. The SAS 108 may then assign orthogonal frequency channels to the vertices connected by the edges. This is a graph-coloring-type labeling situation, where the required number of orthogonal channels marks the chromatic number of the graph. No two vertices of the graph may have the same label or color. This ensures that orthogonal frequency channels differ for adjacent vertices of the graph. It should be noted that the term coloring is merely used to indicate the different channel assignment, not that the devices are colored in a specific manner.

As noted above, the CBSD access points 104 may have non-homogeneous bandwidth requirements. Meaning, some CBSD access points 104 may require greater bandwidth than others. The SAS 108 may be configured to color the graph with a minimal number of colors or labels. CBSD access points 104 having the same colors or label may be assigned the same or overlapping frequency ranges. If the total-allocated bandwidth for the total set of colors exceeds that designated by the SAS 108, then the SAS 108 may delete the edge with the least weight (e.g., having the least interference). The SAS 108 may then attempt to recolor the graph. This process may continue until the total allocated bandwidth fits within the range designated by SAS 108.

As shown in the layout 200, CBSD access point 1 is allocated 30 MHz, CBSD access point 2 is allocated 20 MHz, and each of CBSD access points 3-8 is allocated 10 MHz. Moreover, in the layout 200, the interference weight for the edge between CBSD access points 1 and 2 is 5, between CBSD access points 1 and 3 is 5, between CBSD access points 1 and 4 is 2, between CBSD access points 1 and 5 is 3, between CBSD access points 5 and 6 is 7, between CBSD access points 3 and 7 is 4 and between CBSD access points 3 and 8 is 3. It should be noted that in this example the interference scores between the CBSD access points ranges from 1 to 10, where 10 denotes maximum interference. However, this is arbitrary and other scales or methods of ranking the relative interference may be used.

Figure 3:
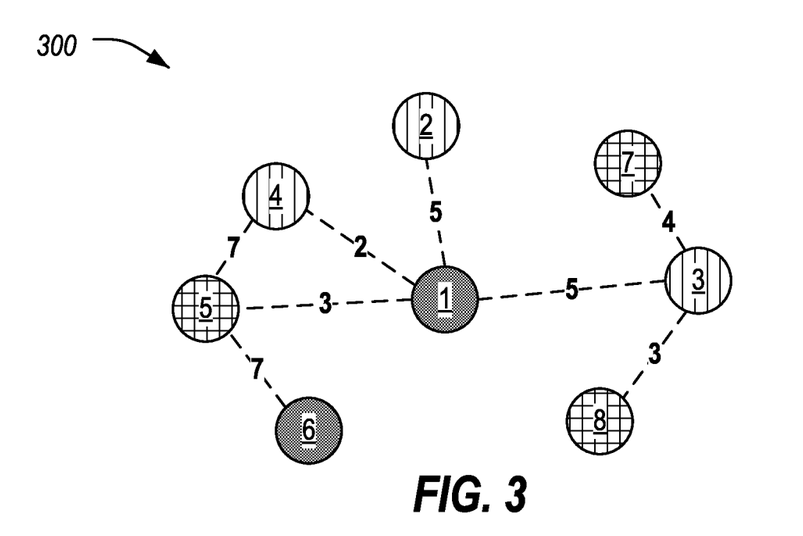
FIG. 3 illustrates an example graph coloring of the layout of FIG. 2 utilizing three colors.

FIG. 3 illustrates an example graph coloring 300 of the layout 200 utilizing three colors. As shown, the coloring divides the nodes into three color groups: a first group including CBSD access points 1 and 6; a second group including CBSD access points 2, 3 and 4; and a third group including CBSD access points 5, 7 and 8. Each group is associated with a different range of frequency channels, such that CBSD access points within a group are assigned channels from the frequency channels within the range of bandwidth of the group. As a result, CBSD access points in different groups are assigned orthogonal frequency channels.

Figure 4:
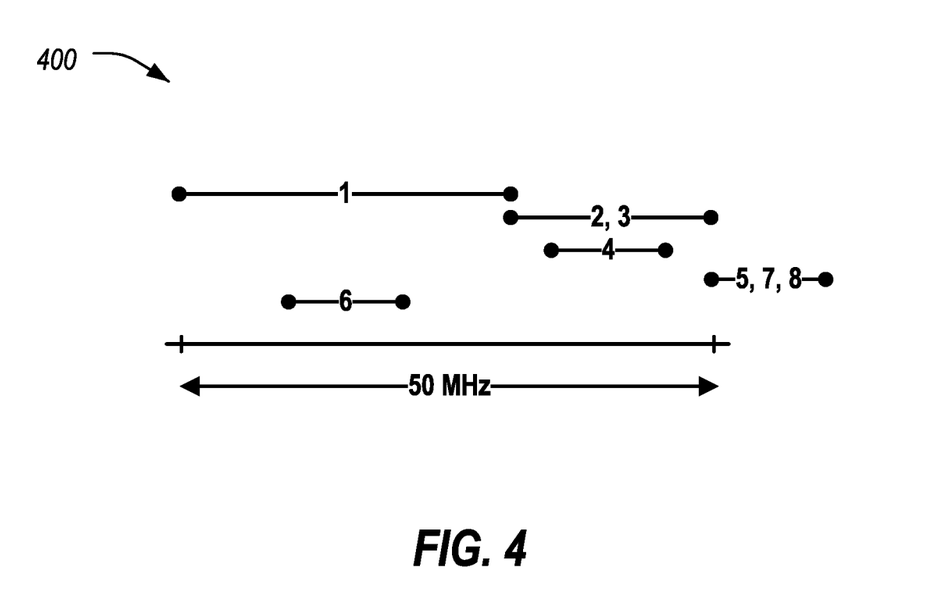
FIG. 4 illustrates an example allocation of bandwidth to the CBSD access points in accordance with the graph coloring of FIG. 3.

FIG. 4 illustrates an example allocation of bandwidth 400 to the CBSD access points in accordance with the graph coloring 300. In the example the SAS 108 is authorized to allocate 50 MHz among the CBSD access points. As shown in the allocation of bandwidth 400, and with continuing reference to the graph coloring 300 for the layout 200, in the first group node 1 requires 30 MHz of bandwidth. Also in the first group, CBSD access point 6 only requires 10 MHz and is allocated a 10 MHz portion of the 30 MHz allocated to CBSD access point 1. Turning to the second group, each of CBSD access points 2 and 3 requires 20 MHz and is allocated as such. CBSD access point 4, also in the second group, only requires 10 MHz and is allocated a 10 MHz portion of the 20 MHz allocated to CBSD access points 2 and 3.

However, as group 1 requires 30 MHz and group 2 requires a different 20 MHz, the entire 50 MHz is allocated and the third group has no available spectrum. Accordingly, this allocation is not feasible. An alternate allocation may be performed by deleting the weakest edge, recoloring, and then reallocation spectrum to the new coloring.

Figure 5:
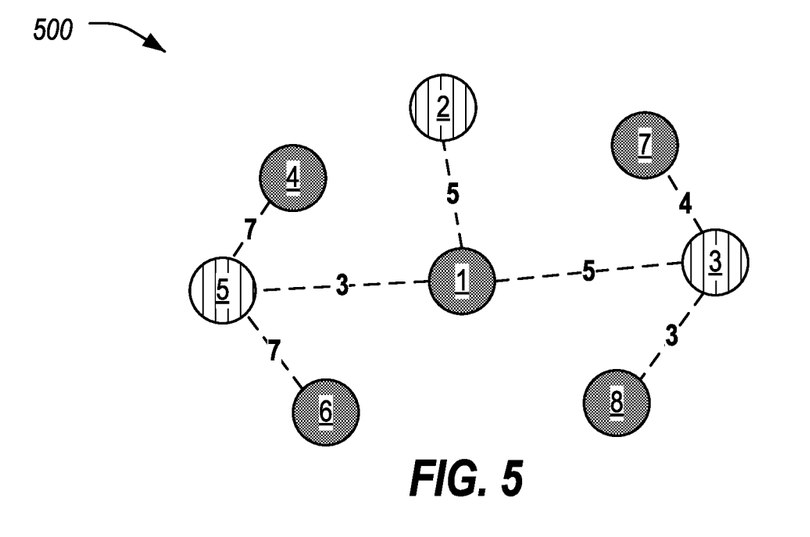
FIG. 5 illustrates an alternate example graph coloring of the layout of FIG. 2 utilizing two colors.

FIG. 5 illustrates an alternate example graph coloring 500 of the layout 200 utilizing two colors. Here, the weakest edge, the edge as shown with weight 2 between CBSD access points 1 and 4 has been removed. As shown, the coloring divides the nodes into two color groups: a first group including CBSD access points 1, 4, 6, 7, and 8; and a second group including CBSD access points 2, 3 and 5.

Figure 6:
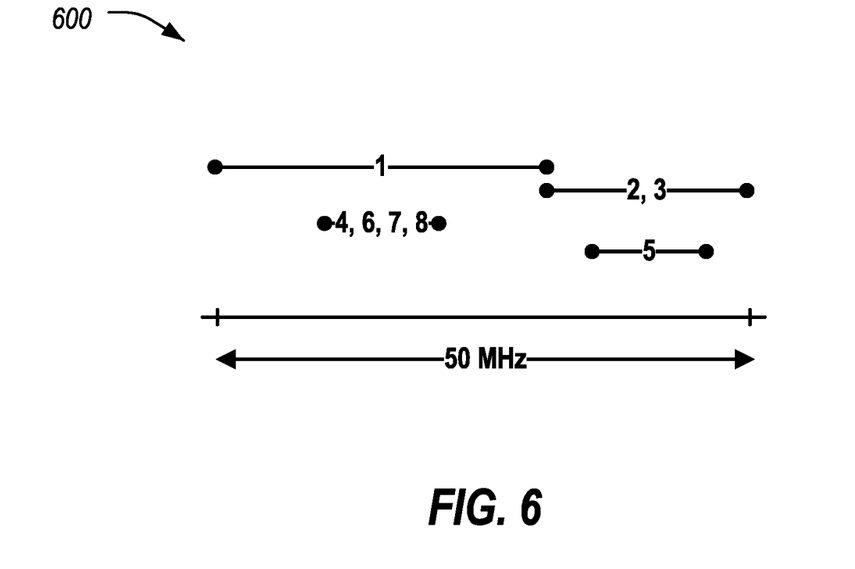
FIG. 6 illustrates an example allocation of bandwidth to the nodes in accordance with the alternate graph coloring of FIG. 5.

FIG. 6 illustrates an example allocation of bandwidth 600 to the nodes in accordance with the graph coloring 500. In the example the SAS 108 is again authorized to allocate 50 MHz among the nodes. As shown in the allocation of bandwidth 600, and with continuing reference to the graph coloring 500 for the layout 200, in the first group CBSD access point 1 requires 30 MHz of bandwidth. Also in the first group, CBSD access points 4, 6, 7, and 8 only require 10 MHz and are each allocated a 10 MHz portion of the 30 MHz allocated to CBSD access point 1. Turning to the second group, each of CBSD access points 2 and 3 requires 20 MHz and is allocated as such. CBSD access point 5, also in the second group, only requires 10 MHz and is allocated a 10 MHz portion of the 20 MHz allocated to CBSD access points 2 and 3. This layout fits within the 50 MHz allocation and is therefore feasible. Accordingly, the allocation of spectrum is complete.

Figure 7:
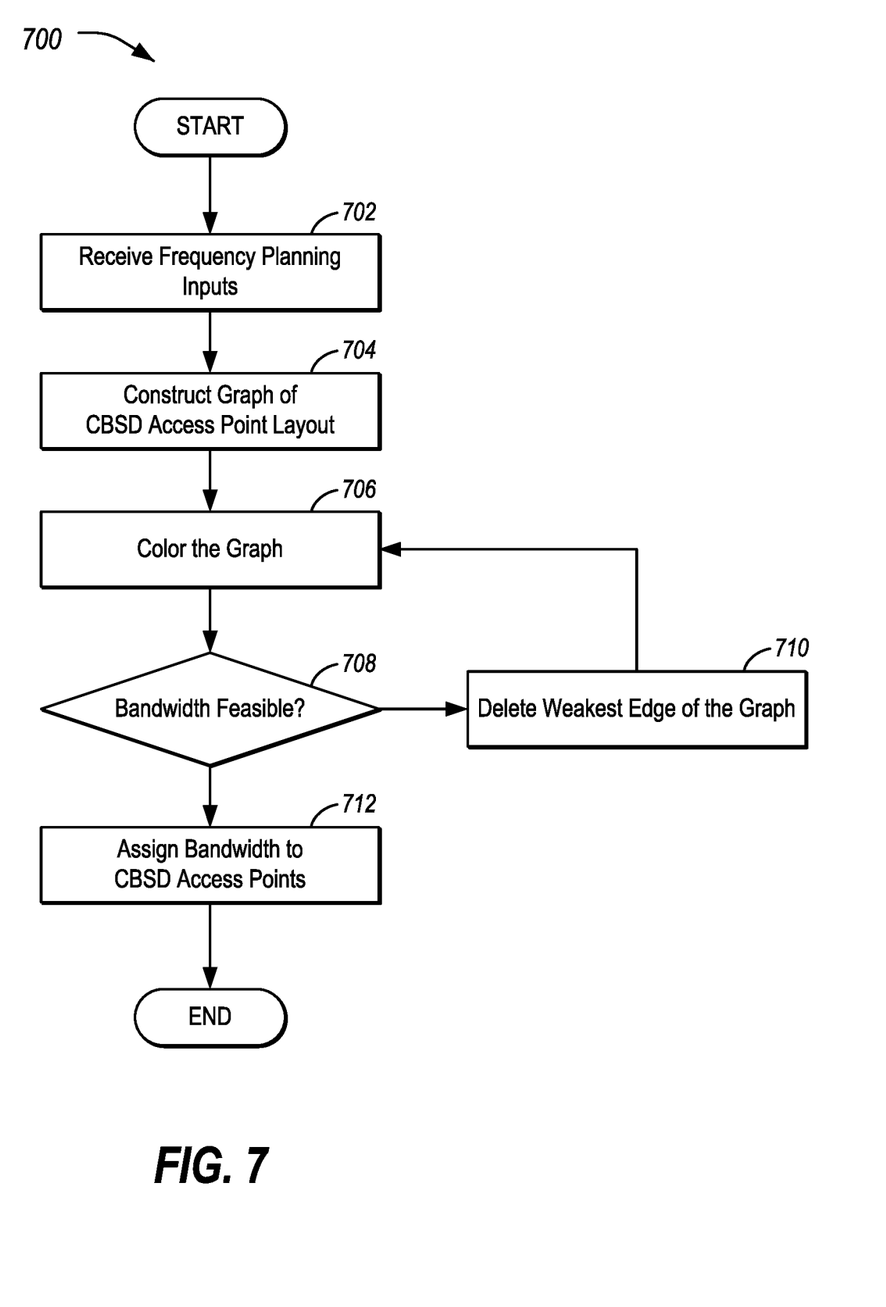
FIG. 7 illustrates an example process for performing inhomogeneous frequency planning.

FIG. 7 illustrates an example process 700 for performing inhomogeneous frequency planning. In an example, the process 700 may be performed by the SAS 108 of the system 100.

At operation 702, the SAS 108 receives inputs for performing the frequency planning. In an example, the SAS 108 receives a SAS-allocated frequency range of X MHz. The SAS 108 may also identify that each of the CBSD access points 104 requires $x_i \times 10$ MHz bandwidth, $$1 \le x_i \le \left\lfloor \frac{X}{10} \right\rfloor.$$

The SAS 108 also receive location and interference information with respect to the CBSD access points 104.

At operation 704, the SAS 108 constructs a graph G with CBSD access points 104 as vertices and weighted edges denoting interference between the vertices. An example graph is illustrated in the layout 200.

At operation 706, the SAS 108 colors the graph G. As used herein, to color refers to a proper vertex coloring, i.e., a labeling of the vertices of the graph G with colors such that no two vertices sharing the same edge have the same color. This may be performed using a graph coloring algorithm such as a brute-force search, dynamic programming to provide a bound on the number of maximal independent sets, the principle of inclusion-exclusion and Yates's algorithm, and/or a greedy algorithm. The coloring may be defined as C=Graph_color(G), where C is a set of tuples including the colors and their corresponding bandwidth requirements.

At operation 708, the SAS 108 determines whether the total bandwidth required by the set of tuples C satisfies the allocated frequency range of X MHz (i.e., whether the configuration is feasible). This may be determined, for example as whether $\Sigma_C BW > X$. If the total bandwidth required by the set of tuples C exceeds X, control passes to operation 710. At operation 710, the SAS 108 deletes the weakest edge of graph G. After operation 710, control returns to operation 706. If, at operation 708, the total bandwidth required by the set of tuples C satisfies X, control passes to operation 712.

At operation 712, the SAS 108 assigns the desired bandwidth to each color C. It should be noted that some many examples, when two CBSD access points 104 with different bandwidth requirements are assigned the same color C, the channel allocated to the smaller request may be situated around a midpoint of the larger bandwidth allocation. This may be done to minimize out-of-band emissions with other color C channels. After operation 712, the process 700 ends.

After an eventful day, CBSD UE 102-equipped autonomous vehicles (AVs) may carry high-priority data crucial for fleet operation. An AV fleet manager may seek to not only efficiently offload/upload data to/from the AVs and minimize the downtime, but also to immediately offload the highest priority data for analysis. A 4G/5G private cellular network core 106 operating on the CBRS band can improve the overall throughput performance of the offload/upload process. Nevertheless, such a design does not consider offload priority of data stored in each AV. As some possible scenarios while offloading AVs data: (i) due to a lack of connectivity resources at a terminal, AVs with high priority data can sit for hours before getting the chance to offload their data; or (ii) due to high congestion at a CBSD access point 104, AVs having high priority data may be offloaded with a lower rate than desired. Using a channel assignment algorithm, such as the process 700 explained herein, the CBSD access point 104 bandwidth requirements and channel assignment may be dynamically reconfigured to offload higher priority data first while minimizing the downtime for AVs.

Setup may be performed using the SAS 108 to account for priority. As noted above, the SAS 108 may provide a range of frequencies in the 3550-3700 MHz range to be shared amongst CBSD access points 104. Each CBSD access points 104 may be assigned a 10 MHz minimum channel bandwidth within the range allowed by SAS 108. Multiple 10 MHz channels (adjacent or non-adjacent) can be aggregated and assigned to a CBSD access points 104 requiring higher capacity. The channel assignment may be based on data offload/upload demands of each of the CBSD UEs 102. The data offload/upload demand at each particular CBSD UE 102 may be maintained by or otherwise provided to the SAS 108. The channel assignment may be refreshed every time period T to ensure that the data transfer is optimal according to the priorities of the information to be transferred. The SAS 108 may utilize the terminal layout and physical characteristics of the environment, as well as the locations of the CBSD access points 104 as discussed above. Interference may be due to coverage overlap between CBSD access points 104. Moreover, the interference value may depend on factors such as the direction of traffic (e.g., upload, download), transmit power of the CBSD access points 104, distance between CBSD access points 104, etc.

Every time period T, the data to be offloaded by each CBSD access point 104 is aggregated according to priority. Additionally, a graph is created where vertices represent CBSD access points 104 and weighted edges represent interference due to coverage overlap between them. Then, bandwidth requirements are computed based on a given function and data priorities for the CBSD access points 104. A graph coloring algorithm may then be used for channel assignment, one example being the algorithm described above with respect to the process 700. This approach may repeat every time period T. There are various ways that time period T may be defined, such as a constant number or based on the changes in data transfer priorities.

For the $i^{th}$ CBSD access point 104, the function $x_i=f(D_i^{j*})$ may be used to determine what portion of available bandwidth should be assigned to the respective CBSD access point 104. This function may manage the tradeoff between practicality and optimality of a proposed approach. A limitation may be placed on maximum available bandwidth for a given CBSD access point 104, given a priority, to improve practicality of the algorithm.

Figure 8:
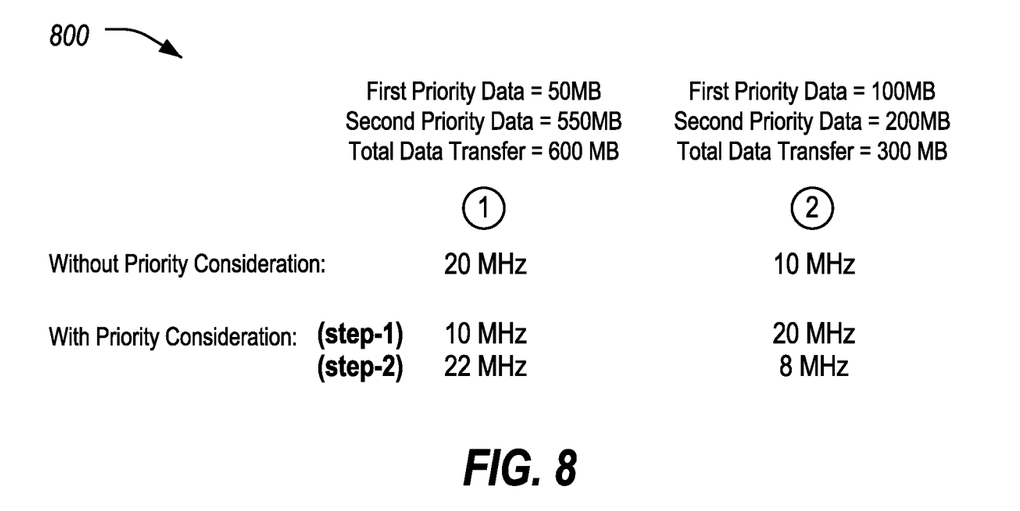
FIG. 8 illustrates an example having two CBSD access points requesting data transfer.

FIG. 8 illustrates an example 800 having two CBSD access points 104 requesting data transfer. In the example the first CBSD access point 104, denoted as 1, has double the data transfer to be performed compared to the second CBSD access point 104, denoted as 2. However, node 2 has a higher priority data transfer need. If priority were not considered, then node 1 may be allocated twice the bandwidth as node 2. With consideration of priority it can be seen that of the first priority data, node 2 has twice the data as compared to node 1. Accordingly, a first allocation of bandwidth may be performed in which node 2 gets twice the bandwidth as node 1, and once the first priority data has been transferred, the bandwidth may be reallocated such that node 1 is allocated a greater bandwidth than that of node 2, commiserate with the proportion of data of second priority to be transferred.

Figure 9:
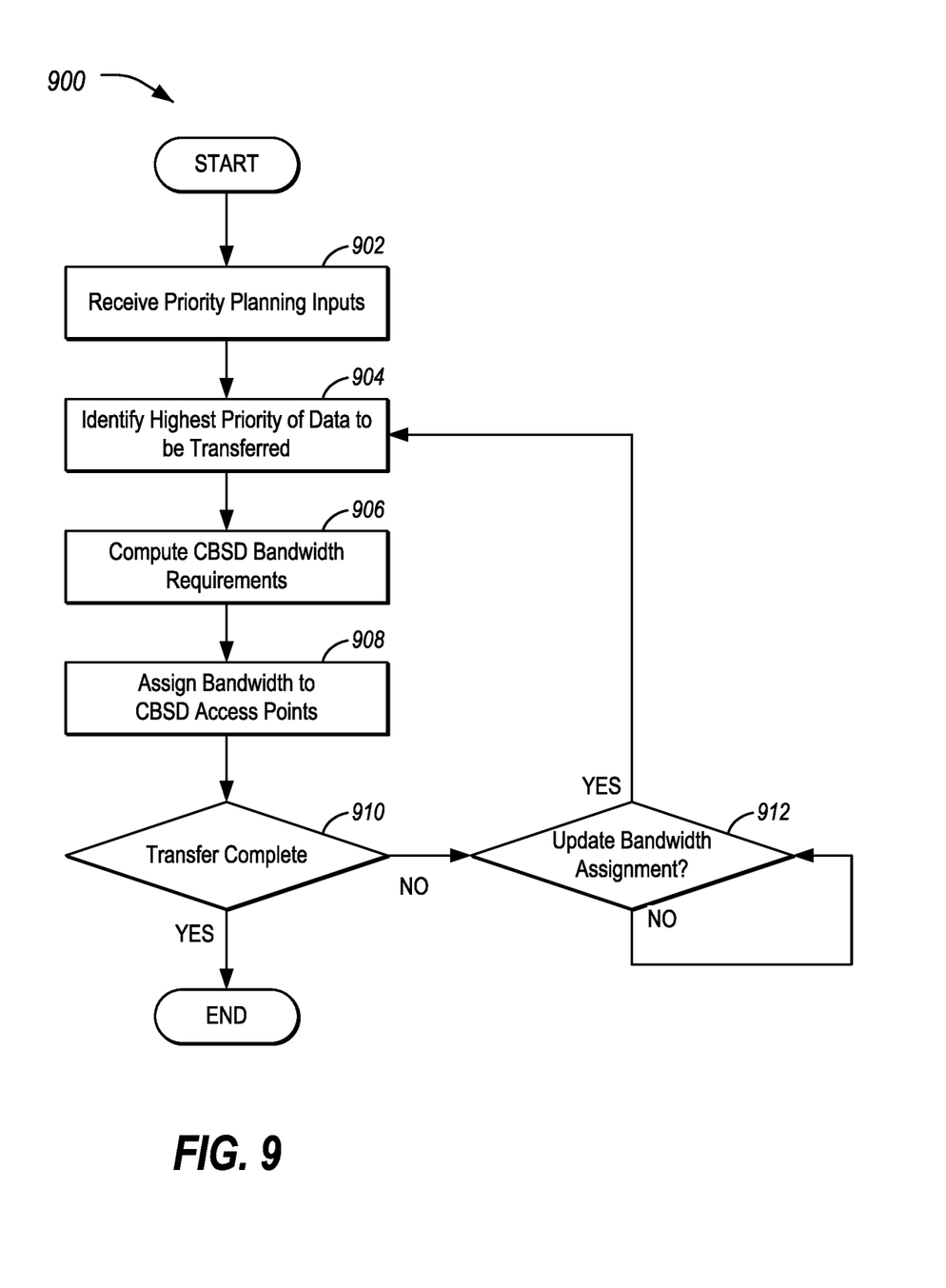
FIG. 9 illustrates an example process for performing of priority-aware dynamic channel assignment for CBSD access points.

FIG. 9 illustrates an example process 900 for performing of priority-aware dynamic channel assignment for CBSD access points 104. In an example, the process 900 may be performed by the SAS 108 in the context of the system 100.

At operation 902, the SAS 108 receives inputs for performing the frequency planning. In an example, the SAS 108 receives a SAS-allocated frequency range of X MHz as well as location and interference information for the CBSD access points 104. The SAS 108 may also receive data transfer demand for each of the CBSD access points 104, $D_i$ and its division based on transfer priority ($D_i^j$), e.g., $D_i=\Sigma_j D_i^j$. (where a smaller j has higher data transfer priority). In some examples, it may be assumed that data download is higher priority than any upload, and upload may be given the lowest priority. In other examples, upload and download may have different data priorities, where some upload priorities may be above some download priorities.

At operation 904, the SAS 108 identifies the highest priority of data (j*) to be transferred. In an example, this may be the transfer of the highest priority data from autonomous vehicles to an autonomous vehicle terminal.

At operation 906, the SAS 108 computes the bandwidth requirement of each of the CBSD access points 104, namely $x_i=f(D_i^{j*})$. It should be noted that $f(.)$ can be tuned based on a trade-off of practicality vs optimality as mentioned above.

At operation 908, the SAS 108 utilizes a CBRS channel assignment algorithm, such as the one discussed in detail with respect to the process 700, to assign bandwidth to the CBSD access points 104.

At operation 910, the SAS 108 determines whether the data transfer has completed. If so the process 900 ends. If not, control passes to operation 912. At operation 912, the SAS 108 determines whether the next time period has elapsed. If so, control returns to operation 904. If not, control remains at operation 912 to continue transferring data using the current bandwidth allocation.

Figure 10:
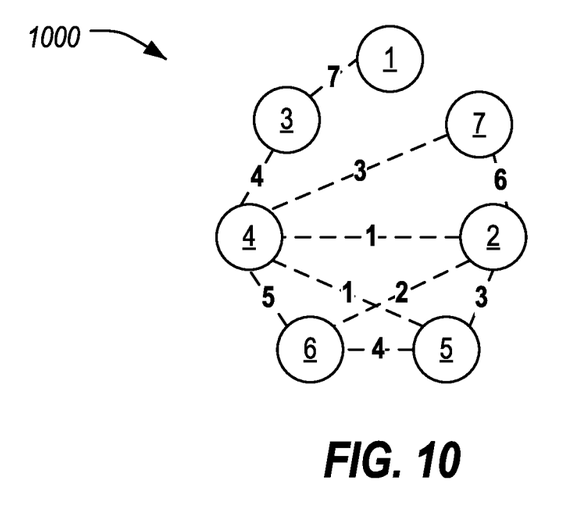
FIG. 10 illustrates an example interference graph for use in priority-based assignment of bandwidth to CBSD access points.

FIG. 10 illustrates an example interference graph 1000 for use in priority-based assignment of bandwidth to CBSD access points 104. In the graph 1000, vertices represent CBSD access points 104 and weighted edges represent interference due to coverage overlap between them. As shown, seven nodes are connected, with some having multiple connections to other nodes and others having single connections to other nodes. Moreover, the interference values differ among the node connections. It should be noted that the interference values may be more relevant where the nodes utilize overlapping spectrum, as when the nodes use non-overlapping spectrum the interference may be reduced or minimal.

Figure 11:
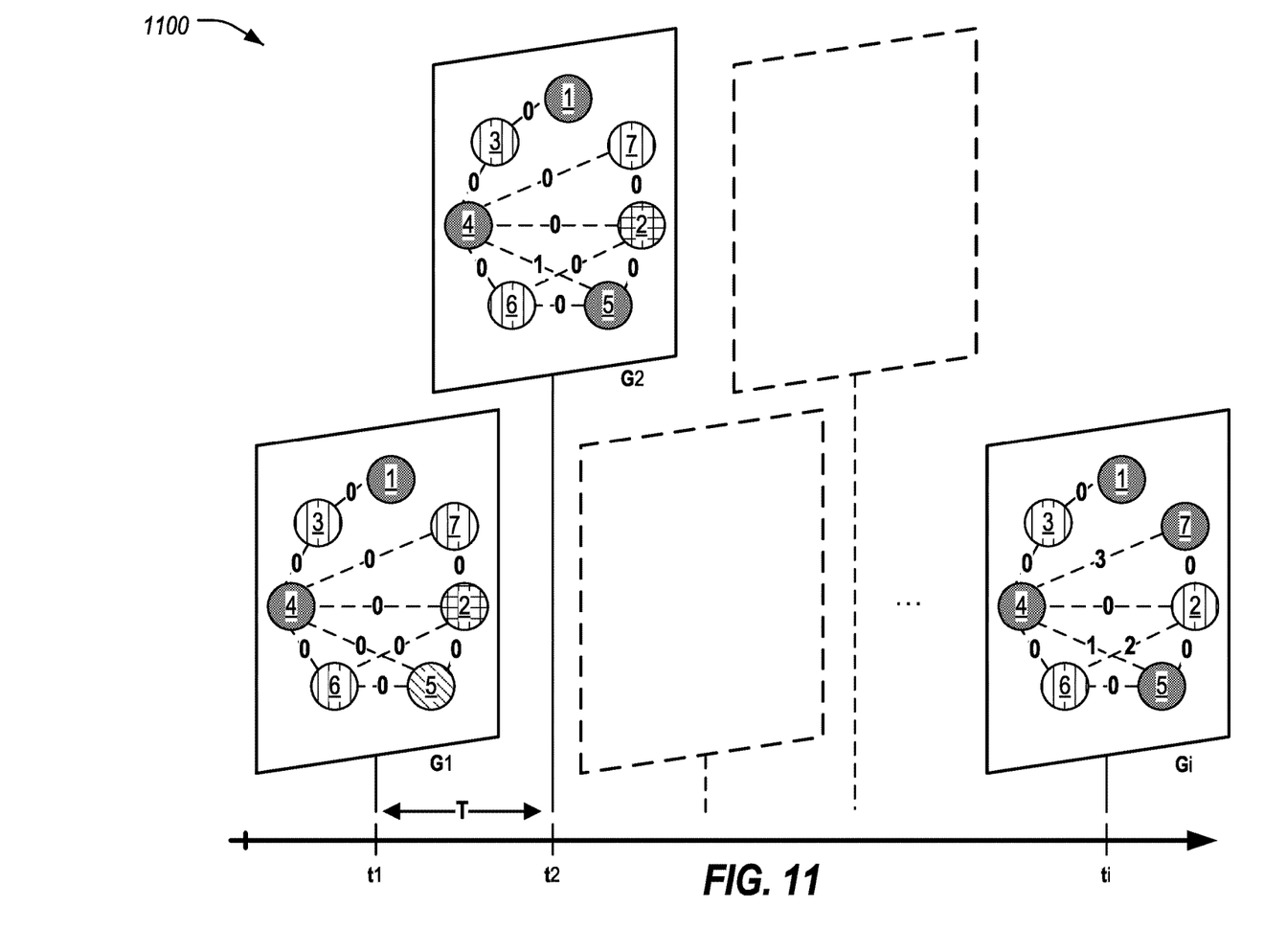
FIG. 11 illustrates an example illustration of an execution of the example process for performing of priority-aware dynamic channel assignment for CBSD access points.

FIG. 11 illustrates an example illustration 1100 of an execution of the example process 900 for performing of priority-aware dynamic channel assignment for CBSD access points 104. As shown, at time t1, a first channel assignment has been performed. Additionally, at time t2, a second channel assignment has been performed. Further channel assignments are performed at periodicity T through time ti so long as further data remains to be offloaded from the CBSD access points 104.

It should be noted that as the number of priorities decrease, the number of groupings may logically also decrease. However, as the number of groupings decrease, the interference between nodes within the same grouping becomes more relevant to the CBRS channel assignment algorithm. This can be seen in the example illustration 1100, as the channel assignment at time t1 has four groupings with no relevant interference as connected adjacent nodes share spectrum. However, at time t2, it can be seen that nodes 4 and 5 now share spectrum and therefore their relative interference as shown in example interference graph 1000 becomes relevant. Similarly, at time t1, it can be seen that connected nodes 4, 5, and 7 have relevant interference weights, as do nodes 2 and 6.

Figure 12:
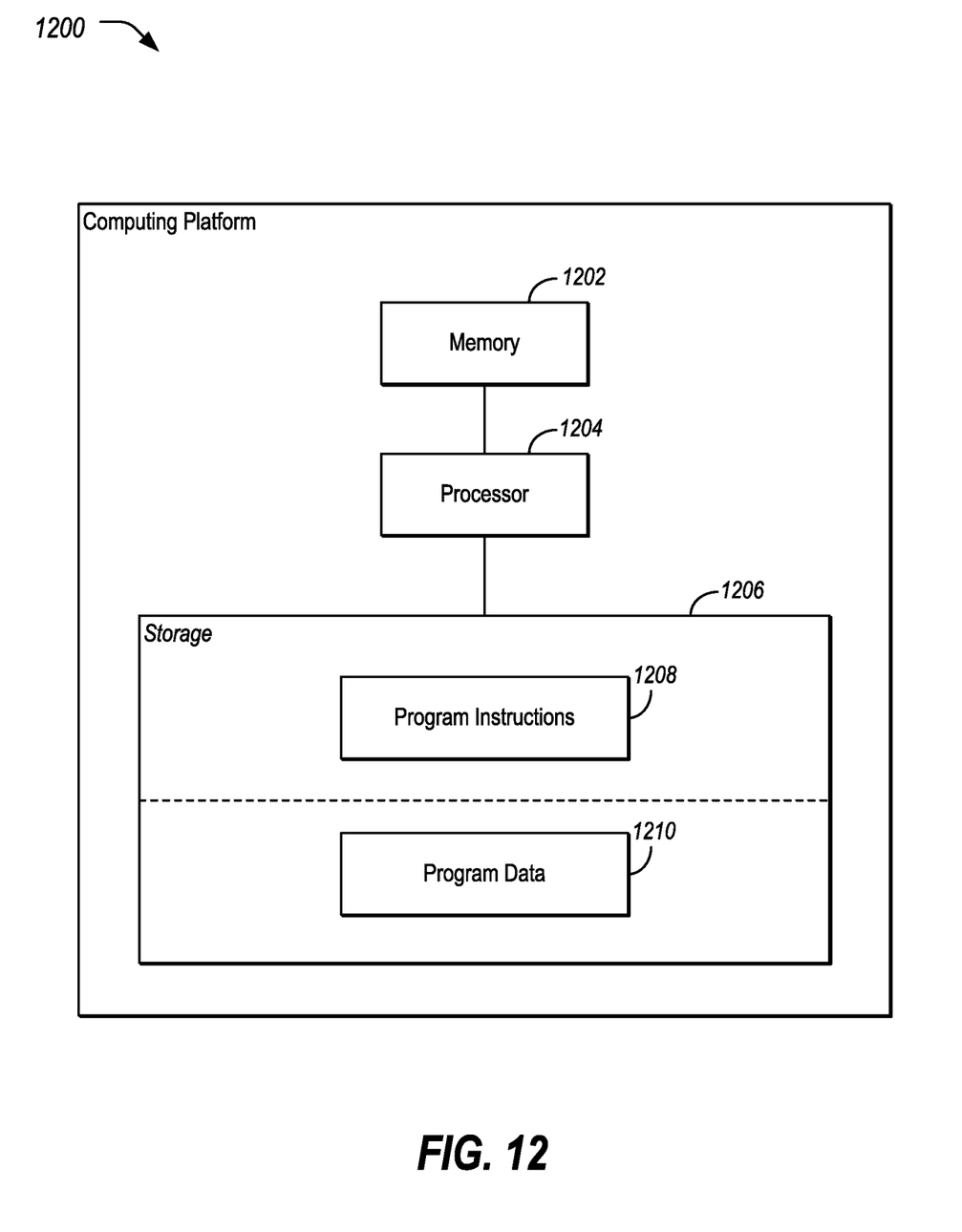
FIG. 12 illustrates an example computing device for performing inhomogeneous frequency planning as well as priority-aware dynamic channel assignment.

FIG. 12 illustrates an example computing device 1200 for performing inhomogeneous frequency planning as well as priority-aware dynamic channel assignment. The algorithms and/or methodologies of one or more embodiments discussed herein may be implemented using such a computing device. For instance, the operations performed herein, such as those of the processes 700 and 900, may be implemented with such a computing device 1200. The computing device 1200 may include memory 1202, processor 1204, and non-volatile storage 1206. The processor 1204 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 1202. The memory 1202 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 806 may include one or more persistent data storage devices such as a hard drive, optical drive, tape drive, non-volatile solid-state device, cloud storage or any other device capable of persistently storing information.

The processor 1204 may be configured to read into memory 1202 and execute computer-executable instructions residing in program instructions 1208 of the non-volatile storage 1206 and embodying algorithms and/or methodologies of one or more embodiments. The program instructions 1208 may include operating systems and applications. The program instructions 1208 may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by the processor 1204, the computer-executable instructions of the program instructions 1208 may cause the computing device 1200 to implement one or more of the algorithms and/or methodologies disclosed herein. The non-volatile storage 806 may also include data 1210 supporting the functions, features, and processes of the one or more embodiments described herein.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for allocating network bandwidth among devices, comprising:
    a controller of a network, configured to perform an allocation of a set bandwidth among devices, the allocation including to:
        construct a graph of the devices, each device requiring an amount of bandwidth over the network, each vertex of the graph corresponding to a respective one of the devices, each edge of the graph connecting devices according to a weight denoting interference between the connected devices;
        label the vertices of the graph with labels such that no two vertices sharing the same edge have the same label, each label requiring bandwidth corresponding to the device of that label requiring the most bandwidth;
        if the sum of the bandwidth required for the labels exceeds the set bandwidth, delete the edge of the graph having the least interference, and again perform the construct and label operations; and
        if the sum of the bandwidth required for the labels is within the set bandwidth, assign the bandwidth to the devices.

2. The system of claim 1, wherein the controller is further configured to, responsive to two devices with different bandwidth requirements being assigned the same label, allocate channel to the device of the two devices having a smaller bandwidth requirement around a midpoint of channel assigned to the device of the two devices having a larger bandwidth requirement.

3. The system of claim 1, wherein the devices are configured to transmit data having a plurality of priorities, and the controller is further configured to:
    identify a highest priority of the plurality of priorities;
    compute highest priority data bandwidth requirements of each of the devices according to the relative quantities of data of the highest priority to be transmitted by the devices; and
    perform the allocation of the set bandwidth among the devices according to the highest priority data bandwidth requirements.

4. The system of claim 3, wherein the controller is further configured to periodically update the highest priority data bandwidth requirements.

5. The system of claim 3, wherein the highest priority data bandwidth requirements are defined as a function further accounting for the relative quantities of data of the priorities other than the highest priority.

6. The system of claim 1, wherein the network is a Citizens Broadband Radio Service (CBRS) network, the controller is a spectrum access system (SAS) of the CBRS, and the devices are CBRS device (CBSD) access points.

7. A method for performing an allocation of a set bandwidth among devices of a network, comprising:
    constructing a graph of the devices, each device requiring an amount of bandwidth over the network, each vertex of the graph corresponding to a respective one of the devices, each edge of the graph connecting devices according to a weight denoting interference between the connected devices;
    labeling the vertices of the graph with labels such that no two vertices sharing the same edge have the same label, each label requiring bandwidth corresponding to the device of that label requiring the most bandwidth;
    if the sum of the bandwidth required for the labels exceeds the set bandwidth, deleting the edge of the graph having the least interference, and again perform the construct and label operations; and
    if the sum of the bandwidth required for the labels is within the set bandwidth, assigning the bandwidth to the devices.

8. The method of claim 7, further comprising responsive to two devices with different bandwidth requirements being assigned the same label, allocating channel to the device of the two devices having a smaller bandwidth requirement around a midpoint of channel assigned to the device of the two devices having a larger bandwidth requirement.

9. The method of claim 7, wherein the devices are configured to transmit data having a plurality of priorities, and further comprising:
    identifying a highest priority of the plurality of priorities;
    computing highest priority data bandwidth requirements of each of the devices according to the relative quantities of data of the highest priority to be transmitted by the devices; and
    performing the allocation of the set bandwidth among the devices according to the highest priority data bandwidth requirements.

10. The method of claim 9, further comprising periodically updating the highest priority data bandwidth requirements.

11. The method of claim 9, wherein the highest priority data bandwidth requirements are defined as a function further accounting for the relative quantities of data of the priorities other than the highest priority.

12. The method of claim 7, wherein the devices communicate with a Citizens Broadband Radio Service (CBRS) network, the method is performed by a spectrum access system (SAS) of the CBRS, and the devices are CBRS device (CBSD) access points.

13. A non-transitory computer-readable medium comprising instructions for performing an allocation of a set bandwidth of a network among devices that, when executed by a processor, cause the processor to:
    construct a graph of the devices, each device requiring an amount of bandwidth over the network, each vertex of the graph corresponding to a respective one of the devices, each edge of the graph connecting devices according to a weight denoting interference between the connected devices;
    label the vertices of the graph with labels such that no two vertices sharing the same edge have the same label, each label requiring bandwidth corresponding to the device of that label requiring the most bandwidth;

if the sum of the bandwidth required for the labels exceeds the set bandwidth, delete the edge of the graph having the least interference, and again perform the construct and label operations; and if the sum of the bandwidth required for the labels is within the set bandwidth, assign the bandwidth to the devices.

14. The medium of claim 13, further comprising instructions that, when executed by the processor, cause the processor to, responsive to two devices with different bandwidth requirements being assigned the same label, allocate channel to the device of the two devices having a smaller bandwidth requirement around a midpoint of channel assigned to the device of the two devices having a larger bandwidth requirement.

15. The medium of claim 13, wherein the devices are configured to transmit data having a plurality of priorities, and the medium further comprises instructions that, when executed by the processor, cause the processor to:

identify a highest priority of the plurality of priorities;

compute highest priority data bandwidth requirements of each of the devices according to the relative quantities of data of the highest priority to be transmitted by the devices; and perform the allocation of the set bandwidth among the devices according to the highest priority data bandwidth requirements.

16. The medium of claim 15, further comprises instructions that, when executed by the processor, cause the processor to periodically update the highest priority data bandwidth requirements.

17. The medium of claim 15, wherein the highest priority data bandwidth requirements are defined as a function further accounting for the relative quantities of data of the priorities other than the highest priority.

18. The medium of claim 13, wherein the network is a Citizens Broadband Radio Service (CBRS) network, the processor is a spectrum access system (SAS) of the CBRS, and the devices are CBRS device (CBSD) access points.

* * * * *